US012743650B1

(12) United States Patent
Ramesh et al.

(10) Patent No.: US 12,743,650 B1
(45) Date of Patent: Sep. 22, 2026

(54) QUANTUM COMPUTATION FOR CUSTOMER SERVICE OPTIMIZATION

(71) Applicant: Accenture Global Solutions Limited, Dublin (IE)

(72) Inventors: Shreyas Ramesh, Mountainside, NJ (US); Kung-Chuan Hsu, Cerritos, CA (US); Max Howard, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 1141 days.

(21) Appl. No.: 17/836,231

(22) Filed: Jun. 9, 2022

Related U.S. Application Data

(60) Provisional application No. 63/208,674, filed on Jun. 9, 2021.

(51) Int. Cl.
*G06N 10/60* (2022.01)
*G06N 10/20* (2022.01)
*G06Q 30/015* (2023.01)

(52) U.S. Cl.
CPC ........... *G06N 10/60* (2022.01); *G06Q 30/015* (2023.01); *G06N 10/20* (2022.01)

(58) Field of Classification Search
CPC ...... G06N 10/20; G06N 10/60; G06Q 30/015; G06F 17/11
See application file for complete search history.

(56) References Cited

U.S. PATENT DOCUMENTS

| | | | | |
|---|---|---|---|---|
| 10,592,816 B1 * | 3/2020 | Hsu | ........................ | G16H 40/20 |
| 11,574,030 B1 * | 2/2023 | Harrigan | ................ | G06N 10/20 |
| 12,536,349 B2 * | 1/2026 | Watanabe | ............... | G06F 17/11 |
| 2018/0276550 A1 * | 9/2018 | Yarkoni | ................. | G06N 5/046 |

OTHER PUBLICATIONS

McCollum, J. NPL: “QUBO formulations of the longest path problem” (https://www.sciencedirect.com/science/article/pii/S030439752100092X?ref=pdf_download&fr=RR-2&rr=9a4adfbbbdf9f074) (Year: 2021).*

(Continued)

*Primary Examiner* — Emily E Larocque
*Assistant Examiner* — Carlos Heberto De La Garza
(74) *Attorney, Agent, or Firm* — Seed Intellectual Property Law Group LLP

(57) ABSTRACT

Methods, systems, and apparatus for solving service optimization tasks using quantum computation. In one aspect, a method includes receiving data representing a service optimization problem; modelling the service optimization problem as a length-restricted maximum-weighted path (LRMWP) problem on a graph; determining a binary program of the LRMWP problem; mapping the binary program of the LRMWP problem to quadratic unconstrained binary optimization (QUBO) formulation of the LRMWP problem; obtaining data representing a solution to the LRMWP problem from a quantum computing resource; and initiating an action based on the obtained data representing a solution to the LRMWP problem.

19 Claims, 3 Drawing Sheets

(56) References Cited

OTHER PUBLICATIONS

Gao, Y. NPL: "Optimal Web Services Selection Using Dynamic Programming" (https://ieeexplore.ieee.org/stamp/stamp.jsp?tp=&arnumber=1691056&tag=1) (Year: 2006).*

Glover et al., "Quantum Bridge Analytics I: A Tutorial on Formulating and Using QUBO Models," CoRR, submitted on Nov. 4, 2019, arXiv:1811.11538v6, 46 pages.

Kochenberger et al., "The unconstrained binary quadratic programming problem: a survey," Journal of Combinatorial Optimization, Apr. 18, 2014, 28:58-81.

Yao et al., "Path Optimization Algorithms Based on Graph Theory," International Journal of Grid and Distributed Computing, Jun. 2016, 9(6):137-148.

* cited by examiner

QUANTUM COMPUTATION FOR CUSTOMER SERVICE OPTIMIZATION

CROSS-REFERENCE TO RELATED APPLICATION

This application claims the benefit of U.S. Provisional Application No. 63/208,674, filed Jun. 9, 2021, and titled "Quantum Computation for Customer Service Optimization," which is incorporated by reference.

TECHNICAL FIELD

The present invention relates to quantum computing.

BACKGROUND

In a standard customer service model, customers can initiate an engagement through different channels, such as online chat system, phone call, phone app, or in-person visit to a physical service location. Due to the high cost in manning the channels, many types of channels utilize artificial intelligence (AI) to provide service during the engagement. An important problem that an AI-powered system needs to address is what service contents should it propose to the customer such that the service contents are most relevant to the customers' intention and needs and the company acquires as much benefit as possible from the engagement.

Furthermore, oftentimes the different service contents may causally relate to one another. For example, upgrading an existing product may trigger the possibility of the customer accepting another product, since the prior one is a prerequisite of this latter one. As a result, rather than proposing a single service content, the system would ideally determine a sequence of service contents to propose to the customer, in order to maximize the total benefit in this engagement.

SUMMARY

This specification describes methods and systems for applying quantum computing to customer service optimization.

In general, one innovative aspect of the subject matter described in this specification can be implemented in a method that includes receiving data representing a service optimization problem; modelling the service optimization problem as a length-restricted maximum-weighted path (LRMWP) problem on a graph; determining a binary program of the LRMWP problem; mapping the binary program of the LRMWP problem to quadratic unconstrained binary optimization (QUBO) formulation of the LRMWP problem; obtaining data representing a solution to the LRMWP problem from a quantum computing resource; and initiating an action based on the obtained data representing a solution to the LRMWP problem.

Other implementations of this aspect include corresponding classical, quantum or hybrid classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the service optimization problem comprises the problem of determining a sequence of service instances that achieves an optimal total reward.

In some implementations the data comprises one or more of: data specifying a set of service interactions, data specifying relationships between service interactions, and data specifying a maximum number of services to be provided in a customer engagement.

In some implementations the graph comprises i) a vertex for each service interaction in the set of service interactions, ii) a source vertex S indicating a start of an engagement path in the graph, and iii) a terminal vertex T indicating an end of the engagement path.

In some implementations the graph comprises one or more edges between the source vertex and one or more vertices for the service interactions, wherein an edge from the source vertex to a vertex for a particular service interaction indicates the possibility of starting an engagement with the particular service interaction and a corresponding edge weight represents a reward for executing the particular service interaction.

In some implementations the graph comprises one or more edges between vertices for the service interactions, wherein an edge from a first service interaction to a second service interaction indicates the possibility that the second service interaction immediately follows the first service interaction and a corresponding edge weight represents a reward for executing the second service interaction after executing the first service interaction.

In some implementations the graph comprises one or more edges between the terminal vertex and vertices for the service interactions, wherein an edge from a vertex for a particular service interaction to the terminal vertex indicates that the engagement can stop at the particular service interaction and an edge weight for the edge is equal to zero.

In some implementations the LRMWP problem on the graph comprises the problem of identifying a length-restricted path from the source vertex to the terminal vertex, wherein a corresponding sum of travelled edge weights is maximized.

In some implementations determining the binary program of the LRMWP problem comprises: defining a set of binary variables for the LRMWP problem; defining an objective function as a negative sum of selected edge weights, wherein the sum is weighted using the set of binary variables and the objective function is to be minimized; and defining one or more constraints for the LRMWP problem.

In some implementations the objective function is given by $\Sigma_{i,j:e_{i,j}\in E} w_{i,j}x_{i,j}$ where $e_{i,j}\in E$ represents a directed edge from vertex i to vertex j, $x_{i,j}$ represents a binary variable that takes the value 1 if edge $e_{i,j}$ is in the path and 0 otherwise, and $w_{i,j}\in\mathbb{R}$ represents a weight associated with edge $e_{i,j}$.

In some implementations the one or more constraints comprise one of more of: a first constraint that restricts the number of selected edges outgoing from the source vertex to be equal to 1; a second constraint that restricts the number of selected edges incoming to the terminal vertex to be equal to 1; a third constraint that, for each vertex other than the source vertex and the terminal vertex, restricts the number of selected incoming edges as equal to the number of selected outgoing edges; a fourth constraint that restricts a visit to each vertex to be at most once; and constraints that ensure the selected edges form a path.

In some implementations mapping the binary program of the LRMWP problem to QUBO formulation of the LRMWP comprises: determining respective penalty terms for the one or more constraints; and adding the determined penalty terms to the objective function.

In some implementations determining a penalty term for a first constraint that restricts the number of selected edges outgoing from the source vertex to be equal to 1 comprises: setting a penalty term as equal to $P_0 (\Sigma_{j:e_{0j}\in E} x_{0,j}-1)^2$ where $P_0 \gg 0$ represents a penalty term constant, $e_{0,j} \in E$ represents an edge between the source vertex and vertex j, and $x_{0,j}$ represents a binary variable that takes the value 1 if edge $e_{0,j}$ is in the path and 0 otherwise.

In some implementations determining a penalty term for a second constraint that restricts the number of selected edges incoming to the terminal vertex to be equal to 1 comprises: setting a penalty term as equal to $P_N (\Sigma_{j:e_{j,N}\in E} x_{j,N}-1)^2$ where $P_N \gg 0$ represents a penalty term constant, $e_{j,N}\in E$ represents an edge between vertex j and the terminal vertex, and $x_{j,N}$ represents a binary variable that takes the value 1 if edge $e_{j,N}$ is in the path and 0 otherwise.

In some implementations determining a penalty term for a third constraint that, for each vertex other than the source vertex and the terminal vertex, restricts the number of selected incoming edges as equal to the number of selected outgoing edges comprises: setting a penalty term as equal to $$\sum_{i=1}^{N-1} P_i\left(\sum_{j:e_{i,j}\in E} x_{i,j} = \sum_{k:e_{k,i}\in E} x_{k,i}\right)^2$$

where $P_i \gg 0$ $\forall$i represent penalty terms constants, $e_{i,j}\in E$ represents an edge between vertex i and vertex j, and $x_{i,j}$ represents a binary variable that takes the value 1 if edge $e_{i,j}$ is in the path and 0 otherwise.

In some implementations determining a penalty term for a fourth constraint that restricts a visit to each vertex to be at most once comprises: setting a penalty term as equal to $$\sum_{i=1}^{N-1} P_i\left(\sum_{j:e_{i,j}\in E} x_{i,j} - a_i\right)^2$$

where $P_i \gg 0$ $\forall$i represent penalty term constants, $e_{i,j}\in E$ represents an edge between vertex i and vertex j, $x_{i,j}$ represents a binary variable that takes the value 1 if edge $e_{i,j}$ is in the path and 0 otherwise, and $a_i$ represents a binary variable from a set of N−1 binary variables, where N represents the number of vertices.

In some implementations a penalty term for constraints that ensure the selected edges form a path comprises: setting a penalty term as equal to $$P_C\left(\sum_{i,j:e_{i,j}\in E} x_{i,j} + \sum_{k=0}^{\lceil log_2(C+2)\rceil-1} b_k 2^k - (C+1)\right)^2$$

where $P_C \gg 0$ represents a penalty term constant, $e_{i,j}\in E$ represents an edge between vertex i and vertex j, $x_{i,j}$ represents a binary variable that takes the value 1 if edge $e_{i,j}$ is in the path and 0 otherwise, and $b_k$ represents a binary variable from a set of $\lceil \log_2(C+2)\rceil$ binary variables, where C represents a positive constant.

In some implementations the quantum computing resource comprises a quantum annealing computer, optionally wherein the solution to the LRMWP problem is computed using quantum adiabatic computation.

In some implementations the quantum computing resource comprises a gate-based universal quantum computer, optionally wherein the solution to the LRMWP problem is computed using a Quantum Approximate Optimization Approach or other quantum-classical hybrid variational algorithm.

The subject matter described in this specification can be implemented in particular ways so as to realize one or more of the following advantages.

A system implementing the presently described techniques can accurately model a service optimization problem as a longest path problem. The ability to model a service optimization problem as a longest path problem offers a fundamentally unique approach to recommending solutions.

In addition, the presently described techniques for solving service optimization problems are particularly adapted for a specific technical implementation—quantum computing. In the present disclosure, the service optimization problem is modelled as length-restricted maximum-weighted path problem on a graph. This model is embedded into a binary program to which a specific mapping is applied in order to generate a corresponding quadratic unconstrained binary optimization (QUBO) formulation of the LRMWP problem. A quantum computing resource can therefore be used to obtain a solution to the service optimization problem, since many quantum computing resources, e.g., quantum annealer devices, accept QUBO formulations of problems by mapping the QUBO formulation into a qubit network of the quantum computing resource. That is, the presently described techniques are motivated by technical considerations of the internal functioning of the quantum computing resource.

Further, systems that utilize quantum computing resources, as described in this specification, can more quickly obtain solutions to optimization problems (such as customer service optimization problems) compared to systems that use only classical computing resources. In addition, systems that utilize quantum computing resources can obtain solutions to larger sized and more complex optimization problems compared to systems that utilize classical computing resources only (and without the use of heuristics that typically reduce the complexity of the problem and therefore produce solutions with lower accuracy). Because of this improvement in computational runtime and performance, service optimization problems can be updated and solved in real time. This can be particularly advantageous in the customer service settings, where queries or other engagements with customers require quick solutions or answers.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes modeling the optimization of service contents in customer service systems as a path optimization problem on a graph. The graph optimization problem can be efficiently reduced to a quadratic unconstrained optimization problem that quantum computers can solve.

Figure 1:
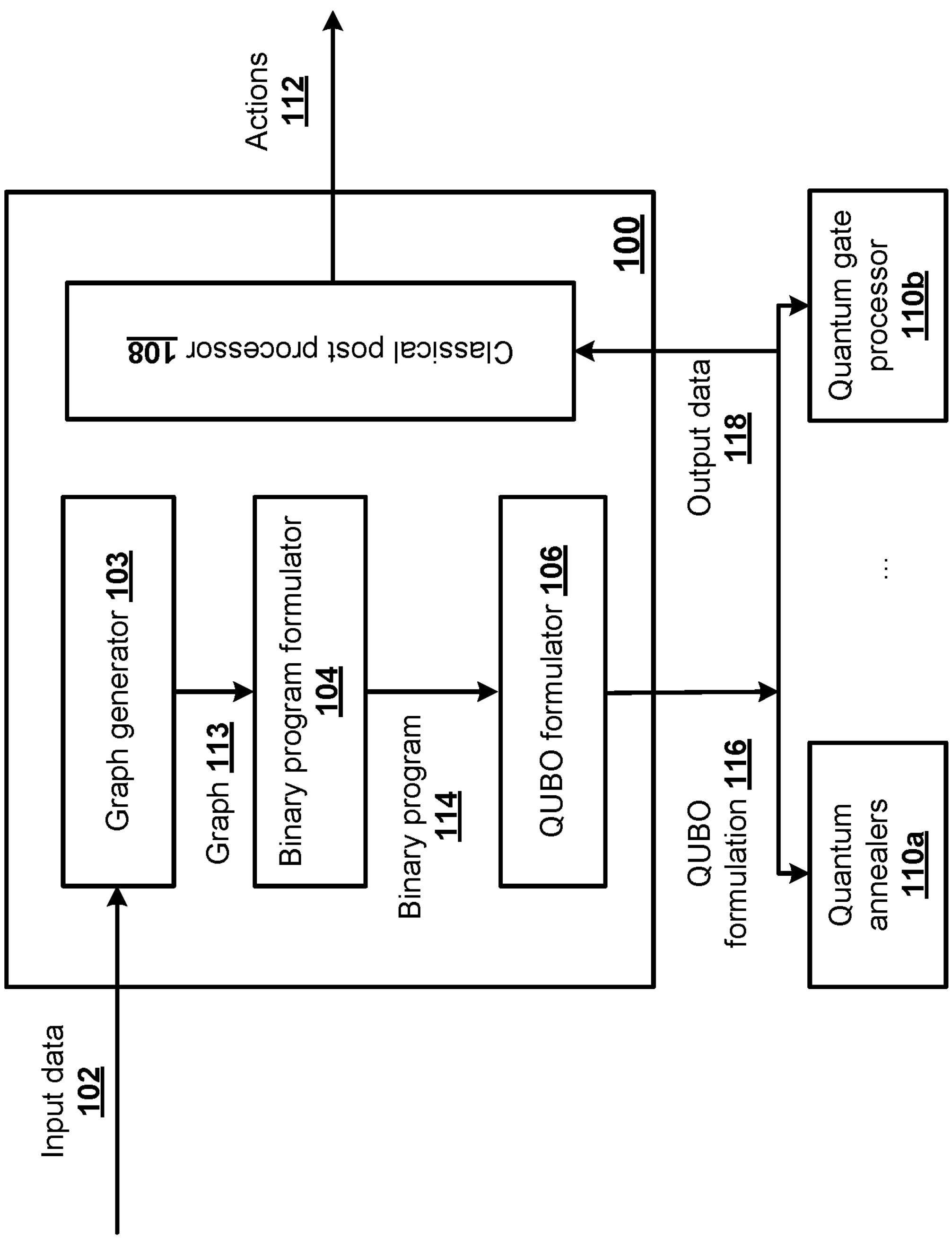
FIG. 1 shows an example system for customer service optimization.

FIG. 1 shows an example system 100 for customer service optimization. The system 100 is an example of a system implemented as computer programs on one or more classical and quantum computing devices in one or more locations, in which the systems, components, and techniques described in this specification can be implemented.

The system 100 includes a graph generator 103, a binary program formulator 104, a QUBO formulator 106, a classical post-processor/user interface generator 108, and one or more quantum computing resources, e.g., quantum annealer 110*a* and quantum gate processor 110*b*. For convenience, two quantum computing resources are shown in FIG. 1, with the quantum computing resources being external to the system 100, e.g., provided as an external cloud service. However in some implementations the system 100 can include the quantum computing resources. Components of the system 100 can be in data communication with each other and with each of the additional quantum computing resources, e.g., through a communication network such as a local area network or wide area network.

The system 100 is configured to receive as input data representing a service optimization problem, e.g., input data 102. Example input data 102 is described below with reference to step 202 of FIG. 2. In some implementations the input data 102 can be received through a user interface presentation displayed by the system 100. The system 100 processes the received input data 102 to generate as output data representing actions to be initiated, e.g., actions 112. The actions are based on a determined solution to the service optimization problem. The system can also generate user interface presentations as output, which can also be based on a determined solution to the service optimization problem.

The system 100 is configured to determine a solution to the service optimization problem represented by the input data 102. To determine a solution to the service optimization problem, the system 100 uses one or more of the graph generator 103, binary program formulator 104, the QUBO formulator 106, or the classical post processor/user interface generator 108.

The graph generator 103 is configured to receive the input data 102 and to model the service optimization problem specified by the input data 102 as a length-restricted maximum-weighted path (LRMWP) problem on a graph. Example operations performed by the graph generator 103 are described below with reference to step 204 of FIG. 2.

The graph generator 103 is configured to provide data representing the LRMWP problem on the graph 113 to the binary program formulator 104. The binary program formulator 104 is configured to process the received data 113 and generate data representing a binary program of the LRMWP problem 114. Example operations performed by the binary program formulator are described below with reference to step 206 of FIG. 2.

The binary program formulator 104 is configured to provide the binary program 114 of the LRMWP problem to the QUBO formulator 106. The QUBO formulator 106 is configured to receive the binary program 114 of the LRMWP problem and to map the binary program 114 of the LRMWP problem to a quadratic unconstrained binary optimization (QUBO) formulation 116 of the LRMWP problem. Example operations performed by the QUBO formulator 106 to map a binary program of the LRMWP problem to a QUBO formulation are described below with reference to FIG. 2.

The system 100 is configured to transmit data representing the QUBO formulation 116 of the LRMWP problem to one or more of the quantum computing resources. The quantum computing resources can include quantum annealer computing resources, e.g., quantum annealer 110*a*. A quantum annealer is a device configured to perform quantum annealing—a procedure for finding the global minimum of a given objective function over a given set of candidate states using adiabatic quantum computation and quantum mechanical phenomenon such as quantum tunneling. Adiabatic quantum computation provides a procedure to maintain a quantum system in its ground state, such that an optimization problem can be solved by encoding the optimal solution as the ground state of the quantum system's final Hamiltonian. Quantum tunneling is a quantum mechanical phenomenon where a quantum mechanical system overcomes localized barriers in the energy landscape which cannot be overcome by a classically described system. Some quantum annealer devices perform a subclass of quantum annealing called adiabatic quantum computing, which relies on the adiabatic theorem to perform computations.

Quantum annealer devices can solve problems if they are formulated in an acceptable format. For example, quantum annealer devices can solve some QUBO formulations of problems by mapping the QUBO formulation into a qubit network of a quantum annealer device.

The quantum computing resources can include one or more quantum gate processors, e.g., quantum gate processor 110*b*. A quantum gate processor includes one or more quantum circuits, i.e., models for quantum computation in which a computation is performed using a sequence of quantum logic gates, operating on a number of qubits (quantum bits).

Quantum gate processors can be used to solve certain optimization problems, e.g., problems that can be formulated as a QUBO problem. For example, some quantum gate processors can solve QUBO problems by simulating a corresponding adiabatic quantum annealing process using a gate model. This can be advantageous, e.g., compared to directly performing the corresponding adiabatic quantum annealing process using a quantum annealer device, since not all quantum annealer devices can realize physical quantum systems that represent an optimization problem. For example, some quantum annealer devices cannot provide the physical interactions necessary to solve an optimization problem. In these examples, a Hamiltonian describing the optimization problem can be decomposed into a sequence of single or multi-qubit quantum gates, and a solution to the optimization problem can be obtained through application of the sequence of single or multi-qubit gates on a register of qubits and subsequent measurement of the register of qubits.

The quantum computing resources can include one or more quantum simulators.

In some implementations the QUBO formulation 116 generated by the QUBO formulator 106 can be further processed to enable specific solvers to receive and process the QUBO formulation 116 of the LRMWP problem. For example, in some implementations the system 100 can be configured to transmit data representing the QUBO formulation 116 of the LRMWP problem to one or more classical solvers, e.g., by writing the LRMWP problem in an MILP format or by writing the QUBO formulation 116 in an MIQP format. As another example, the system 100 can be configured to transmit data representing the QUBO formulation 116 to an Ising model quantum computer, e.g., by writing the QUBO formulation 116 as an Ising formulation.

The one or more quantum computing resources that receive the transmitted data representing QUBO formulation 116 of the LRMWP problem are configured to process the received data to generate output data 118 representing a solution to the LRMWP problem. The one or more quantum computing resources are configured to provide the generated output data 118 to the system 100, e.g., to the classical post processor/user interface generator 108.

The system 100 is configured to receive the output data 118 from the one or more quantum computing resources. The classical post-processor/user interface generator 108 is configured to process the received output data 118. Processing the output data 118 can include providing the output data 118 as input for additional classical computations or for defining parameters for subsequent quantum computations, and determining one or more actions to be taken based on the solution to the LRMWP problem.

Figure 2:
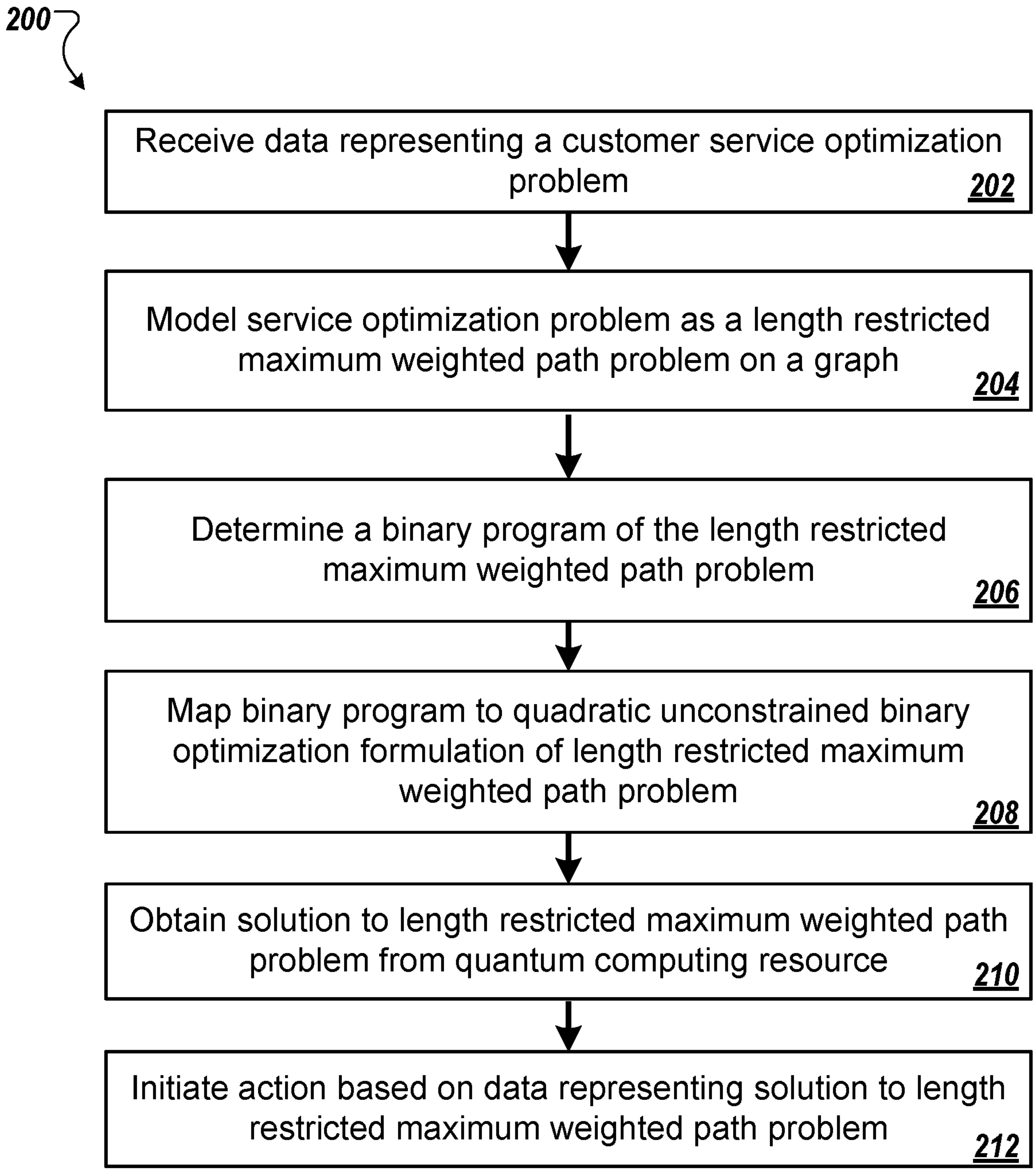
FIG. 2 is a flow diagram of an example process for solving a customer service optimization problem using quantum computing resources.

FIG. 2 is a flowchart of an example process 200 for solving a customer service optimization problem using quantum computing resources. For convenience, the process 200 will be described as being performed by a system of one or more classical and quantum computing devices located in one or more locations. For example, example system 100 of FIG. 1, appropriately programmed in accordance with this specification, can perform example process 200.

The system receives data representing the service optimization problem (step 202). For example, the data can include data specifying a set of services $\{s_1, \ldots, s_M\}$ where M represents the number of different services that can be executed during a particular customer service instance, the different services including the addition or removal of a service product or other events that the service provider controls during the engagement. The data can also indicate relationships between the service interactions, e.g., data specifying whether a service interaction can follow another service interaction during the engagement and data specifying whether a service interaction can start or end the engagement. The data can also include data specifying a maximum number of services to be provided in a customer engagement, e.g., as specified by the service provider. The service optimization problem is the task of determining a best sequence of services to propose to a customer in order to optimize a total reward of going through that service sequence.

The system uses the received data to model the service optimization problem as a length-restricted maximum-weighted path problem on a graph (step 204). That is, the system maps the receive data to a corresponding graph, where the service optimization problem is mapped to the problem of determining a path in the graph with a maximum path reward, as described in more detail below. An example graph on which the system models the service optimization problem as a length-restricted maximum-weighted path problem is shown in FIG. 3.

Figure 3:
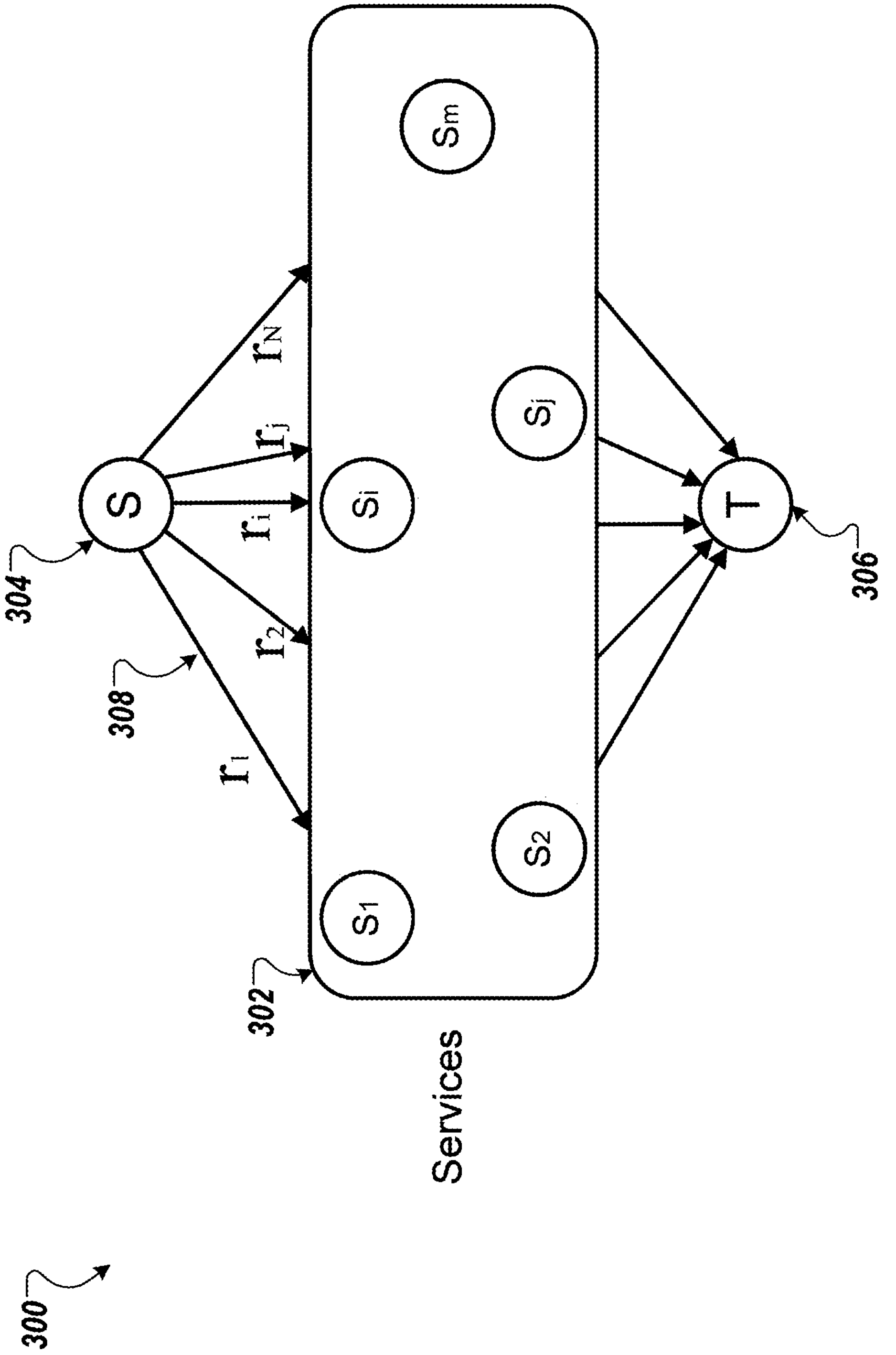
FIG. 3 shows an example graph for a maximum-weighted path problem in the optimization of service sequence.

In FIG. 3, the graph 300 includes a vertex for each service interaction $s_i$ in a set of service interactions, e.g., vertex 302. The graph 300 also includes a source vertex S 304 indicating a start of an engagement path in the graph 300 and a terminal vertex T 306 indicating the end of the engagement path in the graph 300. Edges connect some or all of the vertices, as described below. For example edge 308 connects vertex 304 to vertex 302. In such models, the benefits that contribute to the reward appear as weights on the edges and the goal is to find a path from S to T such that the sum of the weights of the edges travelled is maximized.

The graph 300 includes edges that indicate possible causal relationship between services. For example, the edges can include edges between the source S and one or more service interactions $s_i$. The existence of an edge from the source S to a service $s_i$ indicates the possibility of starting the engagement with service $s_i$. The edge weight $r_i$ represents the reward from executing service $s_i$.

As another example, the edges can include edges between service interactions $s_i$. The existence of an edge from one service $s_i$ to another service $s_j$ indicates the possibility of a service immediately following another service. The edge weight $r_{i,j}$ represents the reward of executing service $s_j$ conditioned on the prior service being $s_i$.

As another example, the edges can include edges between the terminal T and one or more service interactions $s_i$. The existence of an edge from a service $s_i$ to the terminal, T indicates that the engagement can stop at service $s_i$. The edge weight for such an edge can be set to zero to indicate that there is no additional reward in ending the engagement.

Generally, the edge weights can be real numbers and can take negative values. In addition, generally there is no edge from S to T, since the system needs to provide at least some services to the customer, and therefore the source cannot go directly into the terminal.

A valid service sequence is then a path from S to T, and the reward of the path is the sum of all the weights of the edges along the path. The objective of the service sequence optimization problem is then to search for the path that has the maximum reward. The problem becomes a maximum-weighted path (MWP) problem on the graph. In some implementations the service provider can restrict the number of services provided in a customer engagement. In this case, the problem becomes a length-restricted maximum weighted path (LRMWP) problem on the graph.

The LRMWP problem on a graph G can be defined as follows. Let G=(V, E) be a directed graph with weighted edges, where $$V = \{v_i\}_{i=1}^{N}$$

represents a set of N vertices, $v_0$ represents the source vertex, and $v_N$ represents the terminal vertex and $E=\{e_{i,j}$: there exists an edge from $v_i \in V$ to $v_j \in V\}$ represents the set of edges where, for each edge $e_{i,j} \in E$, $w_{i,j} \in \mathbb{R}$ represents its associated weight. Given a restriction $C \in \mathbb{N}$ on the lengths of paths, the length-restricted maximum-weighted path problem is the search of a path on G from the source vertex $v_0$ to the terminal vertex $v_N$ such that the sum of the weights of the edges on the path is maximized.

Returning to FIG. 2, the system determines a binary program of the LRMWP problem (step 206). To determine the binary program of the LRMWP problem, the system can determine a formulation of the LRMWP problem that uses binary valued variables and embed the formulation into a binary program. For example, some LRMWP problems, e.g., LRMWP problems on graphs with negative edge weights, can be expressed in terms of binary valued variables as follows. Let $X=\{x_{i,j} \in \{0,1\}: e_{i,j} \in E\}$ represent a set of binary variables in the binary program, where $\forall i,j \in \{1, \ldots, N\}$ such that $e_{i,j} \in E$:

$$x_{i,j} = \begin{cases} 1, & \text{if } e_{i,j} \text{ is in the path} \\ 0, & \text{otherwise} \end{cases} \quad (1)$$

The system can therefore determine the formulation of the LRMWP problem that uses binary valued variables by: defining a set of binary-valued variables for the LRMWP problem according to Eq. (1), determining a corresponding objective function for the LRMWP problem, and determining one or more constraints for the LRMWP problem. For example, in some implementations the system can define the following equations:

$$\text{maximize} \sum_{i,j:e_{i,j}\in E} w_{i,j}x_{i,j}, \quad (2)$$

$$\text{subject to} \sum_{j:e_{o,j}\in E} x_{0,j} = 1, \quad (3)$$

$$\sum_{i:e_{i,N}\in E} x_{i,N} = 1, \quad (4)$$

$$\sum_{j:e_{i,j}\in E} x_{i,j} = \sum_{ke_{k,i}\in E} x_{k,i} \ \forall i \in \{1, \ldots , N-1\} \quad (5)$$

$$\sum_{j:e_{i,j}\in E} x_{i,j} \leq 1 \ \forall i \in \{1, \ldots , N-1\} \quad (6)$$

$$\sum_{i,j:e_{i,j}\in E} x_{i,j} \leq C+1 \quad (7)$$

$$x_{i,j} \in \{0, 1\} \ \forall i, j \in \{0, \ldots , N\} \text{ such that } e_{i,j} \in E \quad (8)$$

where:

Eq. (2) represents the objective function for the LRMWP problem and is a sum of selected edge weights, where the sum is weighted using the binary-valued variables and the objective of the problem is to maximize this sum.

Eq. (3) is a constraint that restricts the number of selected edges outgoing from the source vertex to be exactly 1.

Eq. (4) is a constraint that restricts the number of selected edges incoming to the terminal vertex to be exactly 1.

Eq. (5) is a constraint that ensures that, for each vertex other than the source vertex and the terminal vertex, the number of selected incoming edges is equal to the number of selected outgoing edges.

Eq. (3)-Eq. (5) are constraints that restrict the selected edges to form a path, where C represents a positive constant.

Eq. (6) is a constraint that restricts the visit to each vertex to be at most once.

Eq. (7) is a constraint that restricts the path to visit at most C vertices. This enables a user to specify a limit on the number of service contents that a customer can go through in one engagement.

In Eq. (2)-(8), $x_{i,j}$ represents the binary variable for edge $e_{i,j}$ as defined in Eq. (1), $w_{i,j}$ represents an edge weight for edge $e_{i,j}$, N represents the number of vertices in the graph, and C represents a positive constant that represents a restriction on the lengths of paths.

As a minimization problem, Eq. (2)-(8) become:

$$\text{minimize} \sum_{i,j:e_{i,j}\in E} -w_{i,j}x_{i,j}, \quad (9)$$

-continued $$\text{subject to} \sum_{j:e_{0j}\in E} x_{0,j} = 1, \quad (10)$$

$$\sum_{i:e_{i,N}\in E} x_{i,N} = 1, \quad (11)$$

$$\sum_{j:e_{i,j}\in E} x_{i,j} = \sum_{k:e_{k,i}\in E} x_{k,i} \ \forall i \in \{1, \ldots , N-1\} \quad (12)$$

$$\sum_{j,e:_{i,j}\in E} x_{i,j} \leq 1 \ \forall i \in \{1, \ldots , N-1\} \quad (13)$$

$$\sum_{i,j:e_{i,j}\in E} x_{i,j} \leq C+1 \quad (14)$$

$$x_{i,j} \in \{0, 1\} \ \forall i, j \in \{0, \ldots , N\} \text{ such that } e_{i,j} \in E \quad (15)$$

The system can generate a binary program using the formulation of the LRMWP problem as given above with reference to Eq. (1)-(8) or (1), (9)-(15).

The system maps the binary program of the length-restricted maximum-weighted path problem to quadratic unconstrained binary optimization (QUBO) formulation of the length-restricted maximum-weighted path problem (step 208).

In a QUBO problem, there is only one objective function that is a quadratic function of the variables. An important step involved in mapping the LRMWP problem to a QUBO problem is to include the constraints in the QUBO objective function as penalty terms, such that when those constraints are violated, there is an introduced penalty that would impose a large penalty value, which renders an objective value that is far from optimal.

The system maps each equality constraint in the LRMWP problem into the QUBO objective function as follows. Without loss of generality, let x represent a string of n variables, and $f:\{0, 1\}^n \rightarrow \mathbb{R}$ represent a function such that the equality constraint is given by $$f(x) = 0. \quad (16)$$

The system maps the equality constraint to a QUBO formulation by defining a penalty term that is added to the objective function to impose a large penalty value, where the penalty term is given by $$P \cdot f(x)^2 \quad (17)$$

for some sufficiently large penalty constant $P \gg 0$. When $f(x) \neq 0$, this term creates a large penalty value that renders a large objective value, which is not optimal in a minimization problem. In situations in which it can be shown that $f(x)>0$, $\forall x$, the penalty term can be P f(x) without the need to square the target function.

The system maps each inequality constraint in the LRMWP problem into the QUBO objective function as follows. Without loss of generality, let $f(x) \in \mathbb{N}$ be a function of the variables, in which the range of the function is N, the set of non-negative integers. Furthermore, let the inequality constraint be:

$$f(x) \leq D \tag{18}$$

where $D \in \mathbb{N}_+$ is a positive integer. In order to create a penalty term for this constraint, the system determines an equivalent representation in the form of an equality constraint. The system then uses the above described method to create a penalty term with the derived equality constraint.

To express the above as an equality constraint, the system introduces a new set of $\lceil \log_2(D+1) \rceil$ binary variables $$a_i \in \{0, 1\}, \text{ for } i = 0, 1, \ldots, \lceil \log_2(D+1) \rceil - 1 \tag{19}$$

and enforces the following constraint $$f(x) + \sum_{i=0}^{\lceil log_2(D+1) \rceil - 1} a_i 2^i = D. \tag{20}$$

Under this constraint, it can be shown that $$f(x) = D - \sum_{i=0}^{\lceil log_2(D+1) \rceil - 1} a_i 2^i \leq D \tag{21}$$

The additional variables at provide the flexibility for f(x) to take values in the range [0, D]. These variables are called slack variables and are sometimes referred to as overhead since the introduction of the variables increases the size of the search space.

Using the techniques described above with reference to Eq. (16)-Eq. (21), the system maps the binary program of the LRMWP problem to a QUBO formulation of the LRMWP problem by determining respective penalty terms for the constraints given by Eq. (10)-Eq. (15) above and adding the determined penalty terms to the objective function.

For example, the system can set a penalty term for the constraint given by Eq. (10) as equal to $$P_0\left(\sum_{j:e_{0,j} \in E} x_{0,j} - 1\right)^2 \tag{22}$$

where $P_0 \gg 0$ represents a penalty term constant, $e_{0,j} \in E$ represents an edge between the source vertex and vertex j, and $x_{0,j}$ represents a binary variable that takes the value 1 if edge $e_{0,j}$ is in the path and 0 otherwise.

As another example, the system can set a penalty term for the constraint given by Eq. (11) as equal to $$P_N\left(\sum_{j:e_{j,N} \in E} x_{j,N} - 1\right)^2 \tag{23}$$

where $P_N \gg 0$ represents a penalty term constant, $e_{j,N} \in E$ represents an edge between vertex j and the terminal vertex, and $x_{j,N}$ represents a binary variable that takes the value 1 if edge $e_{j,N}$ is in the path and 0 otherwise.

As another example, the system can set a penalty term for the constraints given by Eq. (12) as equal to $$\sum_{i=1}^{N-1} P_i\left(\sum_{j:e_{i,j} \in E} x_{i,j} = \sum_{k:e_{k,i} \in E} x_{k,i}\right)^2 \tag{24}$$

where $P_i \gg 0$ $\forall i$ represent penalty terms constants, $e_{i,j} \in E$ represents an edge between vertex i and vertex j, and $x_{i,j}$ represents a binary variable that takes the value 1 if edge $e_{i,j}$ is in the path and 0 otherwise.

As another example, the system can set a penalty term for the constraints given by Eq. (13) by introducing a new set of N−1 binary variables $$\{a_i\}_{i=1}^{N-1} \tag{25}$$

and setting the penalty term as equal to $$\sum_{i=1}^{N-1} \tilde{P}_i\left(\sum_{j:e_{i,j} \in E} x_{i,j} - a_i\right)^2 \tag{26}$$

where $\tilde{P}_i \gg 0$ $\forall i$ represent penalty term constants, $e_{i,j} \in E$ represents an edge between vertex i and vertex j, $x_{i,j}$ represents a binary variable that takes the value 1 if edge $e_{i,j}$ is in the path and 0 otherwise.

As another example, the system can set a penalty term for the constraint given by Eq. (14) by introducing a new set of $\lceil \log_2(C+2) \rceil$ binary variables $$\{b_k\}_{k=1}^{\lceil log_2(C+2) \rceil - 1} \tag{27}$$

and setting the penalty term as equal to $$P_C\left(\sum_{i,j:e_{i,j} \in E} x_{i,j} + \sum_{k=0}^{\lceil log_2(C+2) \rceil - 1} b_k 2^k - (C+1)\right)^2 \tag{28}$$

where $P_C \gg 0$ represents a penalty term constant, $e_{i,j} \in E$ represents an edge between vertex i and vertex j, $x_{i,j}$ represents a binary variable that takes the value 1 if edge $e_{i,j}$ is in the path and 0 otherwise.

The system can then add the determined penalty terms to the objective function given in Eq. (9). The resulting QUBO formulation is given below $$\begin{aligned} \text{minimize} \sum_{i,j e_{i,j} \in E} -w_{i,j} x_{i,j} + P_0\left(\sum_{j:e_{0j} \in E} x_{0,j} - 1\right)^2 \\ + P_N\left(\sum_{j:e_{j,N} \in E} x_{j,N} - 1\right)^2 + \sum_{i=1}^{N-1} P_i\left(\sum_{j:e_{i,j} \in E} x_{i,j} = \sum_{k:e_{k,i} \in E} x_{k,i}\right)^2 \\ + \sum_{i=1}^{N-1} \tilde{P}_i\left(\sum_{j:e_{i,j} \in E} x_{i,j} - a_i\right)^2 + P_C\left(\sum_{i,j:e_{i,j} \in E} x_{i,j} + \sum_{k=0}^{\lceil log_2(C+2) \rceil - 1} b_k 2^k - (C+1)\right)^2 \end{aligned} \tag{29}$$

$$\text{subject to } x_{i,j} \in \{0, 1\}, \forall\, i, j \in \{0, \ldots, N\} \text{ s.t. } e_{i,j} \in E, \tag{30}$$

$$a_i \in \{0, 1\} \ \forall\, i \in \{1, \ldots, N-1\}, \tag{31}$$

$$b_k \in \{0, 1\} \ \forall\, k \in \{0, \ldots, \lceil \log_2(C+2) \rceil - 1\}, \tag{32}$$

where the penalty constants satisfy $P_i$, $\tilde{P}_i$, $P_C \gg 0$ provide large enough violation barriers and:

Eq. (29) is the objective function including all original objectives and constraints.

Eq. (30) shows the binary variables in the binary program, which are also variables in this QUBO problem.

Eq. (31-32) shows the additional binary variables that are added as a result of the QUBO reduction mapping.

The choice of the penalty constants can affect the objective function landscape and therefore the performance of a solver in finding optimal or sub-optimal solutions. Therefore, in considering the penalty constants as parameters to the QUBO problem, parameter tuning can improve the overall performance of solving this QUBO problem.

The system provides data representing the QUBO formulation of the LRMWP problem, e.g., as given by Eq. (29)-Eq. (32), to a quantum computing resource. The system then obtains data representing a solution to the length-restricted maximum-weighted path problem from the quantum computing resource (step 210).

In some implementations the quantum computing resource may be a quantum annealing computer. In these implementations the solution to the length-restricted maximum-weighted path problem may be computed using quantum adiabatic computation. In other implementations the quantum computing resource may be a gate-based universal quantum computer. In these implementations the solution to the length-restricted maximum-weighted path problem may be computed using a Quantum Approximate Optimization Algorithm or other quantum-classical hybrid variational algorithm.

In some implementations, to obtain the data representing a solution to the LRMWP problem, the system can transmit data specifying the QUBO formulation of the LRMWP problem to an external quantum computing resource for processing. The system can then receive data representing a solution to the LRMWP problem from the external quantum computing resource. In other implementations the system can include a quantum computing resource and locally process data specifying the QUBO formulation of the LRMWP problem to obtain data representing a solution to the LRMWP problem.

The system initiates an action based on the obtained data representing a solution to the LRMWP problem (step 212). For example, the system can provide the customer with the recommended service/product contents corresponding to the solution to the LRMWP problem, e.g., the path determined by the quantum computing resource. In this example, the system can generate a graphical user interface that displays the recommended service/product contents corresponding to the solution to the LRMWP problem.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively, or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in physical quantum systems, where the smallest non-trivial physical system is a qubit, i.e., a system that defines the unit of quantum information. It is understood that the term "qubit" encompasses all physical quantum systems or devices that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:

receiving, by a graph generator, input data representing a service optimization problem from a user interface presented in a display of a system, wherein the system includes the graph generator, a binary program formulator, and a QUBO formulator;

modelling, by the graph generator, the service optimization problem as a length-restricted maximum-weighted path (LRMWP) problem on a graph;

determining, by the binary program formulator, a binary program of the LRMWP problem;

mapping, by the QUBO formulator, the binary program of the LRMWP problem to QUBO formulation of the LRMWP problem, wherein mapping of the binary program to the QUBO formulation of the LRMWP problem includes:

transmitting data representing the QUBO formulation of the LRMWP problem to one or more of a quantum computing resources that includes at least a quantum annealer device, and performing, by the quantum annealer device, at least one of quantum annealing or tunnelling for a global minimum by decomposing the LRMWP problem into a sequence of quantum logic gates to provide a solution to the LRMWP problem through application of the sequence of quantum logic gates on a register of qubits for mapping the binary program of the LRMWP problem to the QUBO formulation of the LRMWP problem;

obtaining, by the QUBO formulator, output data representing the solution to the LRMWP problem from the quantum computing resources, wherein the one or more quantum computing resources that receive the transmitted data representing QUBO formulation are configured to process the received data to generate the output data representing the solution and are configured to provide the generated output data, and wherein obtaining the output data representing the solution by:

electrically processing, by one or more quantum circuits, the input data to generate the output data, based on the sequence of quantum logic gates by one or more quantum gate processors of the quantum computing resource; and initiating an action based on the obtained output data representing the solution to the LRMWP problem, wherein the input data comprises one or more of: data specifying a set of service interactions, data specifying relationships between service interactions, and data specifying a maximum number of services to be provided in a customer engagement.

2. The method of claim 1, wherein the service optimization problem comprises the problem of determining a sequence of service instances that achieves an optimal total reward.

3. The method of claim 1, wherein the graph comprises i) a vertex for each service interaction in the set of service interactions, ii) a source vertex S indicating a start of an engagement path in the graph, and iii) a terminal vertex T indicating an end of the engagement path.

4. The method of claim 3, wherein the graph comprises one or more edges between the source vertex and one or more vertices for the service interactions, wherein an edge from the source vertex to a vertex for a particular service interaction indicates a possibility of starting an engagement with the particular service interaction and a corresponding edge weight represents a reward for executing the particular service interaction.

5. The method of claim 3, wherein the graph comprises one or more edges between vertices for the service interactions, wherein an edge from a first service interaction to a second service interaction indicates a possibility that the second service interaction immediately follows the first service interaction and a corresponding edge weight represents a reward for executing the second service interaction after executing the first service interaction.

6. The method of claim 3, wherein the graph comprises one or more edges between the terminal vertex and vertices for the service interactions, wherein an edge from a vertex for a particular service interaction to the terminal vertex indicates that the engagement can stop at the particular service interaction and an edge weight for the edge is equal to zero.

7. The method of claim 3, wherein the LRMWP problem on the graph comprises the problem of identifying a length-restricted path from the source vertex to the terminal vertex, wherein a corresponding sum of travelled edge weights is maximized.

8. The method of claim 3, wherein determining the binary program of the LRMWP problem comprises:

defining a set of binary variables for the LRMWP problem;

defining an objective function as a negative sum of selected edge weights, wherein the sum is weighted using the set of binary variables and the objective function is to be minimized; and defining one or more constraints for the LRMWP problem.

9. The method of claim 8, wherein the objective function is given by $\Sigma_{i,j:e_{i,j}\in E} w_{i,j} x_{i,j}$ where $e_{i,j} \in E$ represents a directed edge from vertex i to vertex j, $x_{i,j}$ represents a binary variable that takes the value 1 if edge $e_{i,j}$ is in the path and 0 otherwise, and $w_{i,j} \in \mathbb{R}$ represents a weight associated with edge $e_{i,j}$.

10. The method of claim 8, wherein the one or more constraints comprise one of more of:

a first constraint that restricts the number of selected edges outgoing from the source vertex to be equal to 1;

a second constraint that restricts the number of selected edges incoming to the terminal vertex to be equal to 1;

a third constraint that, for each vertex other than the source vertex and the terminal vertex, restricts the number of selected incoming edges as equal to the number of selected outgoing edges;

a fourth constraint that restricts a visit to each vertex to be at most once; and constraints that ensure the selected edges form a path.

11. The method of claim 8, wherein mapping the binary program of the LRMWP problem to QUBO formulation of the LRMWP comprises:

determining respective penalty terms for the one or more constraints; and adding the determined penalty terms to the objective function.

12. The method of claim 11, wherein determining a penalty term for a first constraint that restricts the number of selected edges outgoing from the source vertex to be equal to 1 comprises:

setting a penalty term as equal to $P_0 (\Sigma_{j:e_{0,j}\in E} x_{0,j} - 1)^2$ where $P_0 \gg 0$ represents a penalty term constant, $e_{0,j} \in E$ represents an edge between the source vertex and vertex j, and $x_{0,j}$ represents a binary variable that takes the value 1 if edge $e_{0,j}$ is in the path and 0 otherwise.

13. The method of claim 11, wherein determining a penalty term for a second constraint that restricts the number of selected edges incoming to the terminal vertex to be equal to 1 comprises:

setting a penalty term as equal to $P_N\ (\sum_{j:e_{j,N}\in E} x_{j,N}-1)$ where $P_N \gg 0$ represents a penalty term constant, $e_{j,N}\in E$ represents an edge between vertex j and the terminal vertex, and $x_{j,N}$ represents a binary variable that takes the value 1 if edge $e_{j,N}$ is in the path and 0 otherwise.

14. The method of claim 11, wherein determining a penalty term for a third constraint that, for each vertex other than the source vertex and the terminal vertex, restricts the number of selected incoming edges as equal to the number of selected outgoing edges comprises:

setting a penalty term as equal to $$\sum_{i=1}^{N-1} P_i\left(\sum_{j:e_{ij}\in E} x_{i,j} = \sum_{k:e_{k,i}\in E} x_{k,i}\right)^2$$

where $P_i \gg 0\ \forall i$ represent penalty terms constants, $e_{i,j}\in E$ represents an edge between vertex i and vertex j, and $x_{i,j}$ represents a binary variable that takes the value 1 if edge $e_{i,j}$ is in the path and 0 otherwise.

15. The method of claim 11, wherein determining a penalty term for a fourth constraint that restricts a visit to each vertex to be at most once comprises:

setting a penalty term as equal to $$\sum_{i=1}^{N-1} \tilde{P}_i\left(\sum_{j:e_{i,j}\in E} x_{i,j} - a_i\right)^2$$

where $\tilde{P}_i \gg 0 \forall i$ represent penalty term constants, $e_{i,j}\in E$ represents an edge between vertex i and vertex j, $x_{i,j}$ represents a binary variable that takes the value 1 if edge $e_{i,j}$ is in the path and 0 otherwise, and $a_i$ represents a binary variable from a set of N−1 binary variables, where N represents the number of vertices.

16. The method of claim 11, wherein a penalty term for constraints that ensure the selected edges form a path comprises:

setting a penalty term as equal to $$P_C\left(\sum_{i,j:e_{i,j}\in E} x_{i,j} + \sum_{k=0}^{\lceil log_2(C+2)\rceil-1} b_k 2^k - (C+1)\right)^2$$

where $P_C \gg 0$ represents a penalty term constant, $e_{i,j}\in E$ represents an edge between vertex i and vertex j, $x_{i,j}$ represents a binary variable that takes the value 1 if edge $e_{i,j}$ is in the path and 0 otherwise, and $b_k$ represents a binary variable from a set of $\lceil \log_2(C+2)\rceil$ binary variables, where C represents a positive constant.

17. The method of claim 1, wherein the quantum computing resource comprises a quantum annealing computer, optionally wherein the solution to the LRMWP problem is computed using quantum adiabatic computation.

18. The method of claim 1, wherein the quantum computing resource comprises a gate-based universal quantum computer, optionally wherein the solution to the LRMWP problem is computed using a Quantum Approximate Optimization Approach or other quantum-classical hybrid variational algorithm.

19. A system comprising:

one or more computers includes one or more classical and quantum computing devices in one or more locations: a graph generator, a binary program formulator, a QUBO formulator, and a classical post-processor/user interface generator;

one or more quantum computing resources including at least one of a quantum annealer or a quantum gate processor; and one or more computer-readable media coupled to the one or more computers having instructions stored thereon which, when executed by the one or more computers, cause the one or more computers to perform operations comprising:

receiving, by the graph generator, input data representing a service optimization problem from a user interface presented in a display of the system, wherein the system includes the graph generator, the binary program formulator, and the QUBO formulator;

modelling, by the binary program formulator, the service optimization problem as a length-restricted maximum-weighted path (LRMWP) problem on a graph;

determining, by the binary program formulator, a binary program of the LRMWP problem;

mapping, by the QUBO formulator, the binary program of the LRMWP problem to (QUBO) formulation of the LRMWP problem, wherein mapping of the binary program to the QUBO formulation of the LRMWP problem includes:

transmitting data representing the QUBO formulation of the LRMWP problem to one or more of a quantum computing resources that includes at least a quantum annealer device, and performing, by the quantum annealer device, at least one of quantum annealing or tunnelling for a global minimum by decomposing the LRMWP problem into a sequence of quantum logic gates to provide a solution to the LRMWP problem through application of the sequence of quantum logic gates on a register of qubits for mapping the binary program of the LRMWP problem to the QUBO formulation of the LRMWP problem;

obtaining, by the QUBO formulator, output data representing the solution to the LRMWP problem from the quantum computing resources, wherein the one or more quantum computing resources that receive the transmitted data representing QUBO formulation are configured to process the received data to generate the output data representing the solution and are configured to provide the generated output data, and wherein obtaining the output data representing the solution by:

electrically processing, by one or more quantum circuits, the input data to generate the output data, based on the sequence of quantum logic gates by one or more quantum gate processors of the quantum computing resource; and initiating an action based on the obtained data representing the solution to the LRMWP problem, wherein the input data comprises one or more of: data specifying a set of service interactions, data specifying relationships between service interactions, and data specifying a maximum number of services to be provided in a customer engagement.

* * * * *